(No Model.) 3 Sheets—Sheet 3.

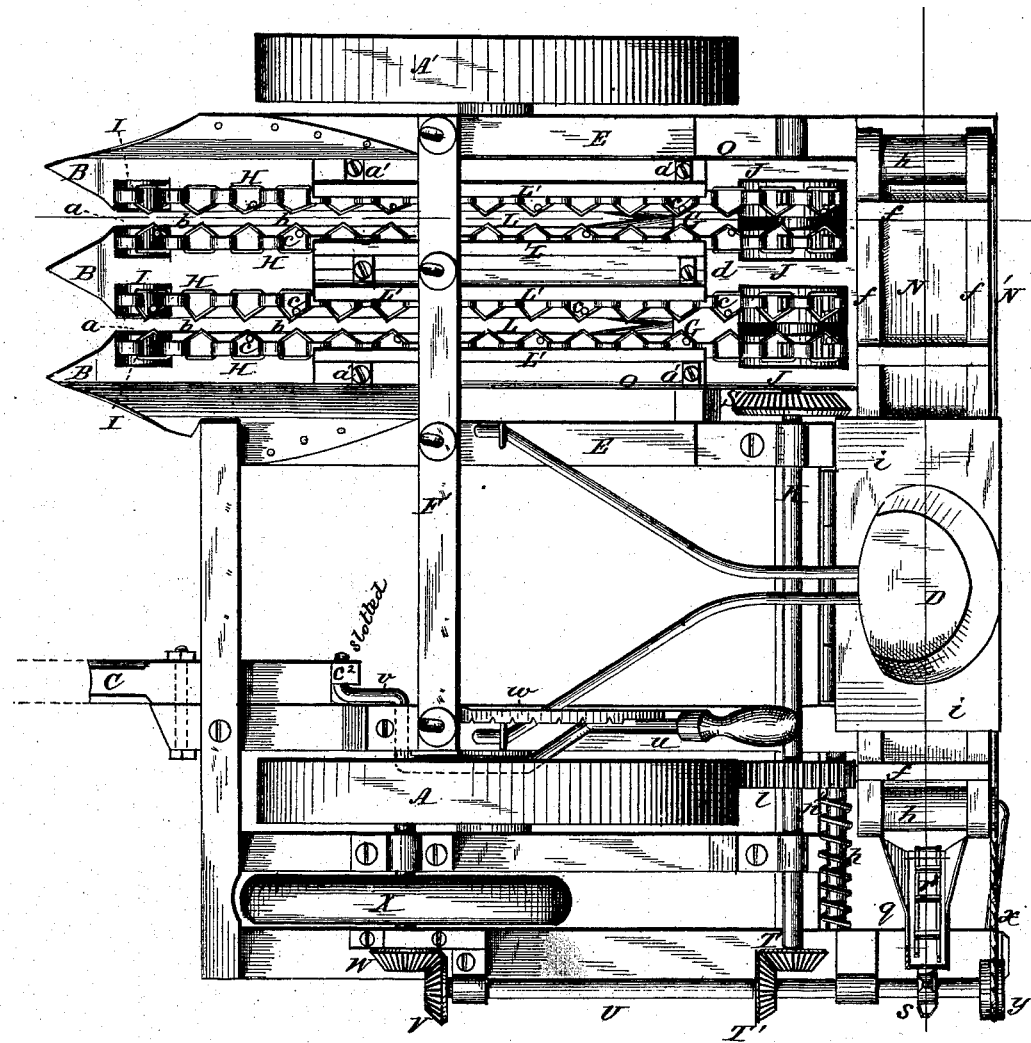

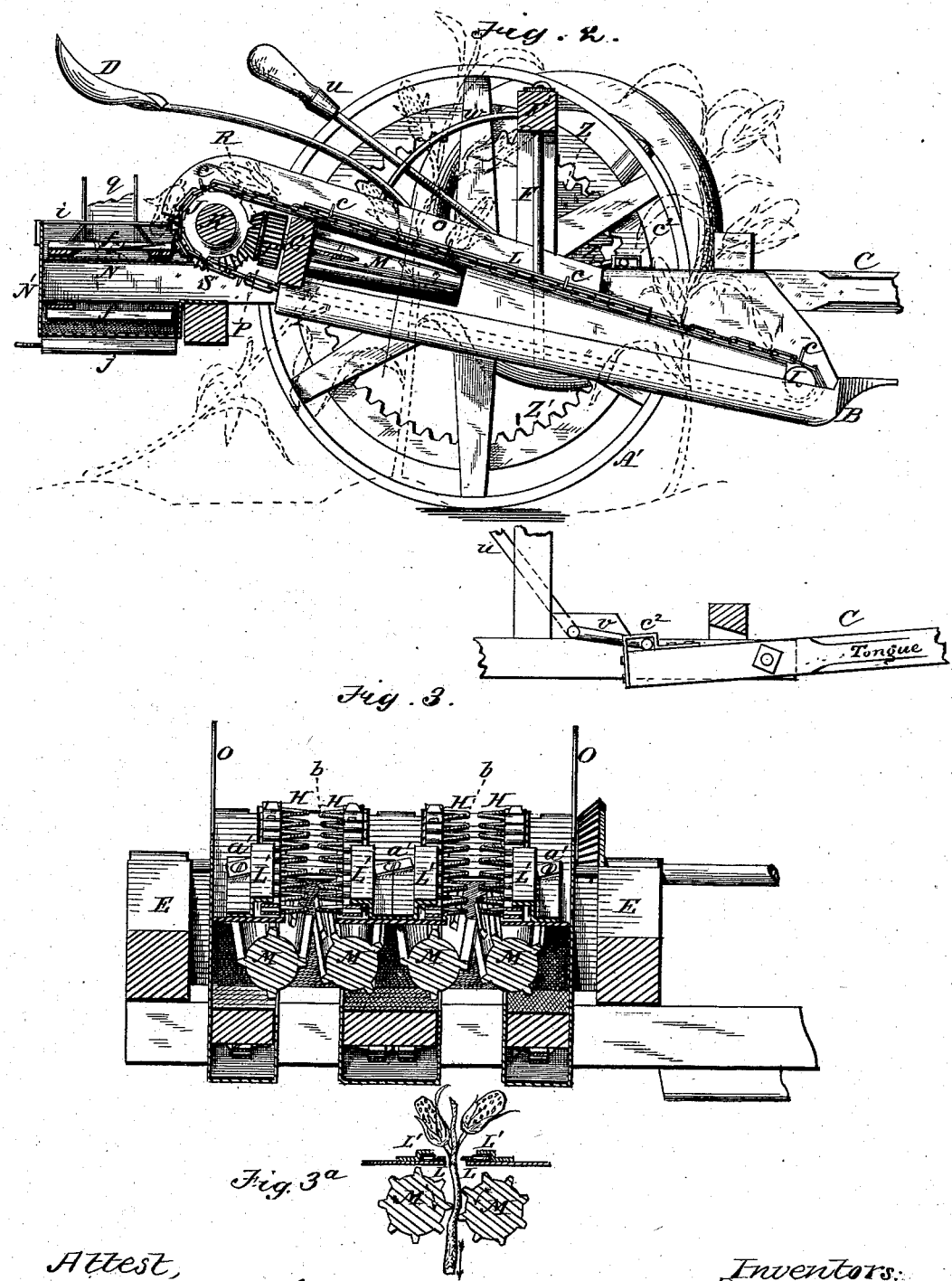

F. J. RANDALL & G. B. SNOW.
Corn Harvester and Husker.

No. 238,051. Patented Feb. 22, 1881.

Attest,
W. H. H. Knight
Floyd Norris

Inventors:
Frank J. Randall
Gilbert B. Snow
by Johnson and Johnson
Attys

UNITED STATES PATENT OFFICE.

FRANK J. RANDALL, OF AURORA, AND GILBERT BENTON SNOW, OF SUGAR GROVE, ILLINOIS.

CORN HARVESTER AND HUSKER.

SPECIFICATION forming part of Letters Patent No. 238,051, dated February 22, 1881.

Application filed July 9, 1880. (No model.)

*To all whom it may concern:*

Be it known that we, FRANK JOHN RANDALL and GILBERT BENTON SNOW, citizens of the United States, residing, respectively, at Aurora and Sugar Grove, in the county of Kane and State of Illinois, have jointly invented new and useful Improvements in Corn Harvesters and Huskers, of which the following is a specification.

We have improved the machine for harvesting corn—that is, separating the ears of corn from the standing stalks—and husking the gathered ears as the machine is drawn forward with its gathering-fingers in line with a row of corn.

Our improvements are the results of successful experiments in gathering corn in the field by machinery.

In the operation of our improved machine the standing stalks are gathered between fingers and carried rapidly backward in the narrow spaces between them, and delivered by the action of endless chains between ribbed rolls arranged in the sides of the fingers, the function of which rolls is to seize and draw the stalks down between the fingers, by which action the corn is stripped or broken from the stalks by being pulled down vertically against and upon the edges of plates upon the fingers. This action keeps the ears of corn free from the pulling-rolls, which we have found cannot be used as the direct stripping elements without serious objections and disadvantages, and we therefore effect the pulling off of the corn-ears by using the rolls merely to receive and draw down the stalks, so as to cause the corn to be pulled off by the edges of the finger-stripping plates, between which the space is too narrow for the ears to pass down. Provision is made for adjusting the chain-setting plates so as to bring them, and the chains which work beneath them, nearer to or farther apart, as may be desired, and to hold the chains properly to their work. Provision is also made for delivering the ears of corn upon a receiving-table, from which they are carried to the husking-rolls by an open-slatted belt at the rear of the machine, by which, also, the husks are discharged by its under or return movement. The husking device gathers and saves the corn that is shelled in the husking operation. Provision is also made for delivering the ears of corn from the machine without being husked, if desired—the construction and arrangement of the several operating parts being such as to adapt the machine for satisfactory work.

Figure 4:
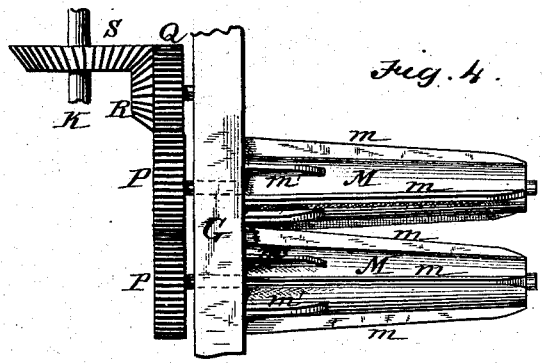
Figure 5:
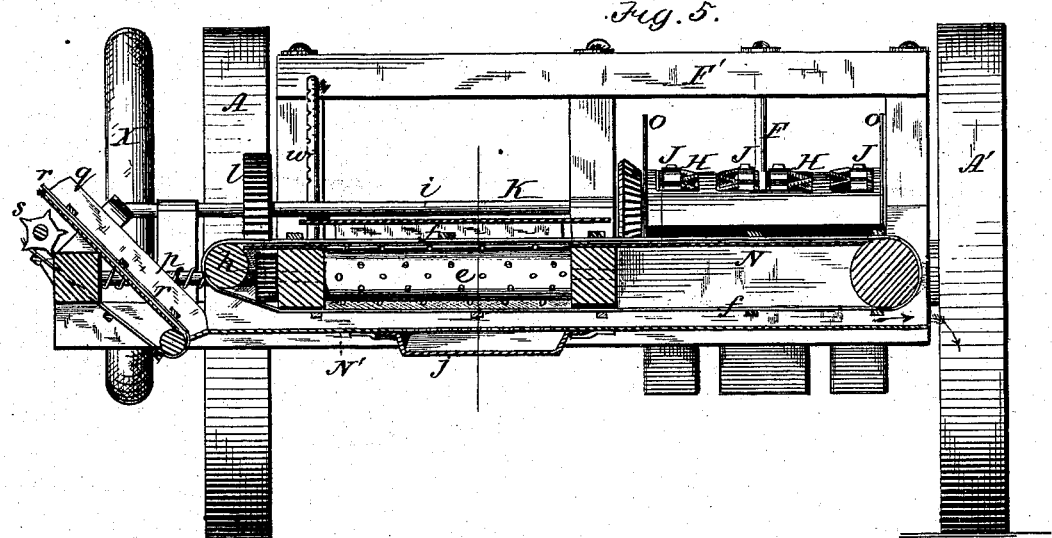
Figure 6:
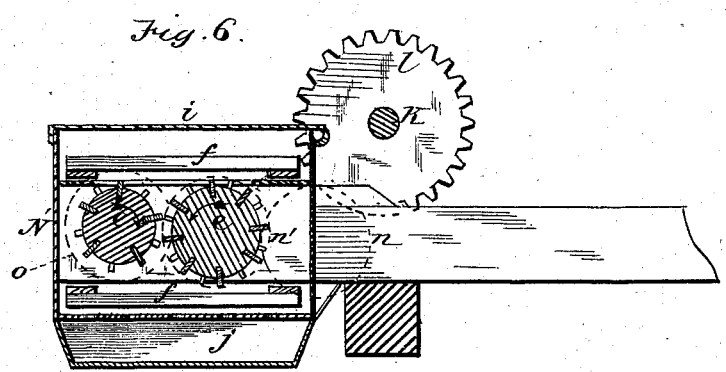

Referring to the accompanying drawings, Figure 1 represents a top view of the entire machine; Fig. 2, a vertical longitudinal section through the gathering-fingers; Figs. 3 and 3ª, cross-sections of the same, showing the relation of the pulling-rolls with the stripping-plates and feeding-chains, and of the stripping action upon the corn; Fig. 4, a top view of a pair of the pulling-rolls; Fig. 5, a longitudinal section of the corn-conveying apron and the husking-rolls, and Fig. 6 a cross-section of the same.

Two wheels, A A', support the machine, and the gathering-fingers B are arranged to act upon a row of corn at the right of the team. The frame is mounted upon short axles of the wheels, which are placed so as to nearly balance the machine, and one or both the wheels may be made to drive the working parts. In the example shown the wheel A connects with and operates these parts, and the tongue C and the driver's seat D are arranged in such relation to said wheel as to avoid any heavy side draft.

The fingers B, which constitute the harvester proper, are supported in upwardly-inclined positions, the two outside ones upon and between the timbers E E of the frame and at the side thereof which runs next the standing corn, while the middle finger is supported by a rod, F, from a top cross-bar, F', thus forming two parallel spaces, *a*, between the fingers, into which the cornstalks are carried as the machine advances, with the points of the fingers running near the ground. These fingers extend in front of the frame, and they are connected at their rear ends by a cross-piece, G, Fig. 2, by which the stalks are arrested as they are carried along in said spaces *a* by the feeding-chains. An endless toothed chain, H, is arranged so as to travel upon each finger, along the sides of the spaces between them, and gather and carry the corn back rapidly between the fingers, said chains being each mounted upon a separate roller, I, placed at or near the point of said finger, and upon a separate sprocket-wheel, J, secured upon a roller or shaft, K, in the rear of the cross-piece G, which, extending across at the rear side of the machine, is operated from the driving-wheel. These chains travel over the stripping-plates L or fingers in vertical paths, and they revolve upward upon the finger-stripping plates L, so as to extend within the spaces, $a$, formed thereby. Over these chains H and upon the fingers are secured plates L', which form the adjustable guides for the chains, and for this purpose they are made adjustable by screws $a'$ and slots, so as to set and hold the chains nearer to or farther from each other, while the stripping-plates extend into and gage the width of the spaces $a$, so that the ears of corn cannot pass down between the plates L. Within the upper end of each finger is placed a tapering roll, M, provided with long and short ribs $m$ and $m'$, and set with its largest end next the cross-piece G, so that their ribbed surfaces meet in pairs within the middle of the spaces between the fingers beneath the stripping-plates. The purpose and function of these rolls is to receive the stalks between them and pull them down, by the biting action of their long and short ribs, between the plates, which latter arrest and thus strip off the corn, as it is too large to pass down, but is left by the pulling action of the rolls upon the plates and chains, which carry them up over the fingers and deliver them upon a table, N. Each link of the chains is provided with a horizontal projection, $b$, on its edge, which travels in the space between the fingers, for the purpose of catching hold of and carrying the stalks up between the fingers and the pulling-rolls. Vertical arms $c$, at suitable intervals, are placed upon this edge of the chain for the purpose of carrying the snapped or separated ears upward and discharging them upon the table. These arms $c$ move between the stripping-plates L, and extend a short distance beyond the edges of said plates, so as to bring them nearer together than said plates. The outside fingers are provided with side guards, O, throughout their length, to prevent the separated ears from rolling off, and the receiving ends of the fingers are inclined or curved on their under sides, and pointed to form a wide entrance to the spaces between them, and allow them to pass near the ground to lift fallen stalks.

The pulling-rolls are of metal, and are arranged so that their upper surfaces are parallel with the stripping-plates L, and so that their ribs, for a distance equal to the short ones $m'$, will touch, or nearly so, to give a grasp upon the stalks sufficient to effectually draw them through the plates L and break or snap the ears by said plates from the stalks. These rolls are mounted in bearings in the fingers and cross-piece G, and are caused to revolve toward each other in pairs by pinions P on the upper ends, placed beneath a short platform, $d$, extending back of the cross-piece G, so as to carry the ears over the shaft K, which drives the chains. From this shaft the pulling-rolls are driven by a pinion, Q, on a short shaft, which also carries a bevel-pinion, R, which meshes with a bevel-wheel, S, on the chain-driving shaft. This shaft K is mounted in suitable bearings, and, extending to the outer side of the frame, is provided at its end with a bevel-gear, T, with which engages a similar bevel-gear, T', on a shaft, U, mounted in bearings upon the outside frame-beam, and which, having a bevel-pinion, V, on its front end, engages with a similar pinion, W, on the shaft of a fly-wheel, X, which is driven by a pinion, Z, engaging with an internal gear, Z', on the driving-wheel. The arrangement and connection of the fly-wheel with the stalk-feeding chains and the pulling-rolls has been found to be of vital importance, in the successful operation of these parts, in communicating and maintaining a uniform motion and power to them.

The table N, which receives the ears of corn from the chains, is arranged in an open-top box, N', secured to the rear beam of the frame. Within this box is also arranged a pair of husking-rolls, $e$, in position at one side of where the ears are delivered upon the table, and over which the table does not extend, leaving the rolls uncovered in relation to said table. They are mounted in suitable bearings, extend parallel with the box and table, and are arranged to revolve toward each other. They are provided with short pins, and their upper surfaces are about on a level with the surface of the table.

An open-slatted carrier, $f$, is arranged to travel over the table N, and the husking-rolls $e$, being mounted upon rolls $h$ at each end of the box, and traveling toward the gearing side of the machine, serves to move the corn from the table and deliver it upon and carry it over the husking-rolls $e$, which, revolving toward each other, tear off the husks from the ears and deliver them into the box below. In this action the ears will have a revolving motion in the valleys formed by the rolls, and at the same time they will be carried along over said rolls by the action of the slats $f$, which move over them transversely thereto, and in such proximity as to act upon the ends of the ears and push and force them along over the pins and discharge them over the carrier-roll at the gearing side of the machine. One roll is of larger diameter than the other, so that its surface exceeds the velocity of the other, and thus give the ears their rotary motion as they pass along the rolls and allow the pins to act upon all sides of the ears. The harvested ears are delivered first upon the table N, so that they will be moved in horizontal positions upon the rolls, and thus prevent the ears striking with their points between the rolls.

The box is provided with a cover, $i$, for the husking-rolls, leaving room only for the ears to be drawn over them by the cross-slats, so that each ear is operated upon alike. The husks are moved along the bottom of the box and discharged therefrom by the return movement of the under portion of the slatted belt, so that the ears are carried out over one end of the open-slatted belt, and the husks are carried out under the other end of said belt and dropped upon the ground or saved in racks, thus utilizing both the forward and return motions of the belt to perform separate and distinct operations. That portion of the bottom of the box in which the husking-rolls are arranged is perforated or grated, and a drawer, $j$, is supported in ways beneath this grated bottom, to catch and save the corn which may be shelled under the operation of the husking-rolls. These rolls receive motion from the shaft K by the gear $l$, which engages with a pinion, $n$, on a short shaft, said pinion engaging with a pinion, $n'$, on the roll nearest to said shaft, which pinion $n'$ engages with a similar pinion, $o$, on the other roll, Fig. 6. The pinion $n$ is fitted loosely on its shaft $p$, and is provided with a clutch-lever, (not shown,) by which it may be thrown out of gear with the husking-rolls when it may be desired to carry the ears of corn unhusked out into a wagon. The shaft $p$ is provided with a coil-spring, which keeps the pinion $n$ in gear with the husking-rolls when the latter are operated. (See Fig. 1.)

The corn, on leaving the husking-rolls, is dropped into the bottom of an upwardly-inclined trough, $q$, supported at the outer or gearing side of the frame, and within this trough an endless elevator, $r$, is arranged to travel over small rolls at the top and bottom of said trough, being operated by a sprocket-wheel, $s$, on the shaft U, which transmits motion from the internal gear-wheel to the several working parts. The corn is thus carried to and delivered into a wagon drawn at the side of the machine, or into a box carried on the harvesting-machine. The points of the gathering-fingers are raised and lowered to facilitate turning the machine in the field, and to raise the fingers in going to and from the field, by means of a lever, $u$, pivoted to the frame in reach of the driver. This lever has a cranked end, $v$, Fig. 1, which connects with a slotted end of the tongue C, which is pivoted to the front bar of the frame. The lever $u$ is held at the proper adjustment by a notched arm, $w$, on the frame.

The arrangement of the chains so as to travel in vertical planes is important, as by such arrangement we are enabled to have two gathering ways or spaces on each side of a middle finger, and thus divide the several stalks of each hill, instead of crowding them all into a single gathering-way by chains traveling in horizontal planes upon two fingers.

It is obvious that two or more pairs of husking-rolls may be used to give the required husking-surface.

The open-slatted carrying-belt $f$ is operated by the cord or chain $x$, passing over a pulley, $y$, on the shaft U. Referring to the adjustment of the chains, we found, in practice, that when the chains were too near together the projections $b$ would cut and break off nearly every stalk before the rollers could draw the ears upon the stripping-plates; but by adjusting the chains farther apart we could gather it to better advantage early as well as late in the season.

We claim—

1. The combination, in a corn-harvesting machine, of the top stripping-plates, L, and the feeding-chains H, arranged to travel upon the gathering-fingers in vertical planes in the described relation to said stripping-plates, the cross-stop G, and the pulling-rolls M, arranged within the fingers and beneath said stripping-plates, substantially as and for the purpose herein set forth.

2. In a corn-harvesting machine, the combination of the gathering-chains H, having the horizontal projections $b$ and the vertical arms $c$, with the top adjustable plates, L', the stripping-plates L, the pulling-rolls M, and the cross-stop G, the said chain projections and arms being adapted to travel in vertical planes between and upon the edges of said stripping-plates, whereby the chains may be adjusted within the gathering-spaces $a$, substantially as herein set forth.

3. The pulling-rolls M, having the long and short ribs $m$ $m'$, and arranged for operation in relation to the stripping-plates L, and within the gathering-spaces $a$ of the fingers, substantially as and for the purpose specified.

4. The combination, in a corn-harvesting machine, of the gathering-fingers B, the feeding-chains H, adapted to revolve in vertical planes thereon, the stripping-plates L, the cross-stop G, and the under pulling-rolls, M, with the table N and the open-slatted belt $f$, adapted to receive and convey the harvested corn direct from the feeding and delivering chains, substantially as herein set forth.

5. The combination of the harvesting and delivering parts for the corn, the receiving-table N, and the open-slatted belt $f$ with the husking-rolls $e$, arranged to form an open continuation of said table, and over which the said open-slatted belt travels to force the corn over the husking-rolls, substantially as herein set forth.

6. The combination of the box N', open at one end, having the receiving-table N, and within which box the husking-rolls are adapted to operate, with the endless open-slatted belt $f$, adapted to carry, by a positive action, the corn over said rolls while being husked, and to discharge the husks from the bottom of said box by the return travel of said belt, substantially as herein set forth.

7. The combination of the husking-rolls, the open-slatted belt, and the open-end box N', having a perforated or grated bottom beneath said rolls, with the receptacle $j$, placed below said grated bottom, and into which the corn which may be shelled in the husking operation is collected, substantially as herein set forth.

8. The combination, in a corn harvester and husker, of mechanism, substantially as described, for gathering and separating the ears from the stalks, a receiving-table, N, an open-slatted carrying-belt $f$, and the husking-rolls $e'$, with the shifting-pinion $n$ and its operating-gear $l$, whereby the operation of said rolls may be suspended without stopping the carrying and discharging belt.

9. The combination, in a machine for harvesting and husking corn, of the endless feeding-chains H, the pulling-rolls M, the endless carrying-belt $f$, and the husking-rolls $e$, with the fly-wheel X and the driving-wheel A, the said pulling-rolls being driven through the medium of the internal gear, $Z'$, the pinions Z W V, and the intermediate gearing shown and described.

In testimony whereof we have hereunto set our hands in the presence of two subscribing witnesses.

FRANK JOHN RANDALL.
GILBERT BENTON SNOW.

Witnesses:
 HENRY A. JUDD,
 JOHN H. DURRAN.